Aug. 23, 1932.  J. L. DRAKE  1,872,693
APPARATUS FOR MAKING LAMINATED GLASS AND METHOD OF OPERATING THE SAME
Filed June 1, 1928  2 Sheets-Sheet 1
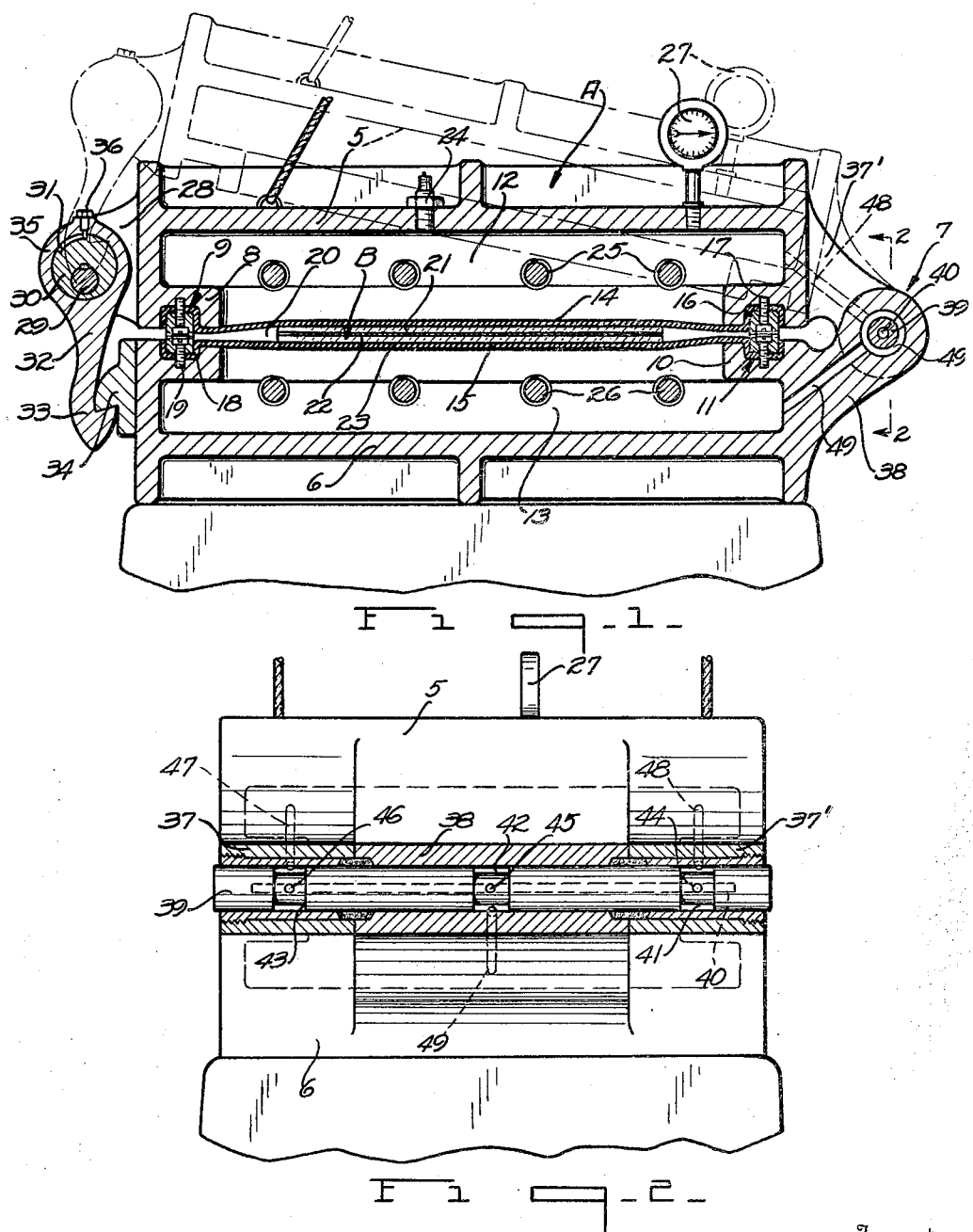

Aug. 23, 1932.    J. L. DRAKE    1,872,693
APPARATUS FOR MAKING LAMINATED GLASS AND METHOD OF OPERATING THE SAME
Filed June 1, 1928    2 Sheets-Sheet 2
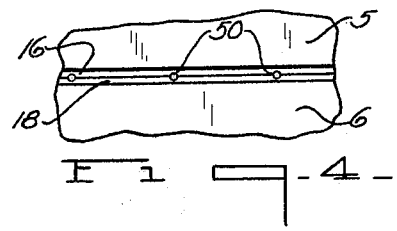
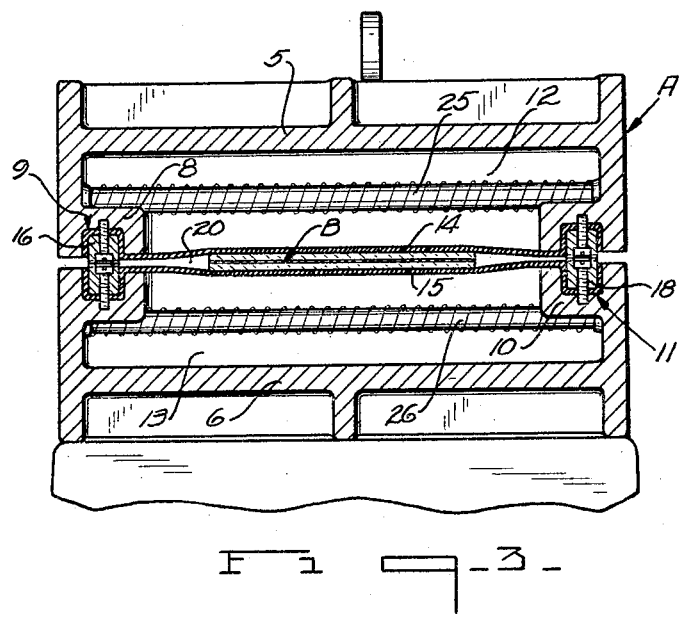
Inventor
John L. Drake
By Frank Fraser
Attorney Patented Aug. 23, 1932

1,872,693

UNITED STATES PATENT OFFICE

JOHN L. DRAKE, OF TOLEDO, OHIO, ASSSIGNOR TO LIBBEY-OWENS-FORD GLASS COMPANY, OF TOLEDO, OHIO, A CORPORATION OF OHIO

APPARATUS FOR MAKING LAMINATED GLASS AND METHOD OF OPERATING THE SAME

Application filed June 1, 1928. Serial No. 282,101.

The present invention relates to an apparatus for use in the manufacture of composite or laminated sheet glass.

The general object of this invention is to provide an improved means for making a compound transparent or translucent laminated sheet composed of two or more sheets of glass with an interposed layer or layers of non-brittle material bonded or united to the glass sheets to form a unitary structure preferably by the combined action of heat and pressure.

One method ordinarily practiced in the production of laminated glass consists in placing the assembled sheets or layers of material to be joined between a pair of resilient diaphragms or within a flexible container, said diaphragms or container being positioned within a suitable pressure chamber. A suitable liquid is then caused to circulate in a heated condition and at different pressures both above and beneath the diaphragms or container whereby heated liquid is circulated for a desired period of time required to properly soften the bonding material and/or the interposed layer or layers of non-brittle material after which the liquid is adapted to be circulated under pressure thereby acting upon the diaphragms or container and the contents thereof to secure adhesion and effect the union of the assembled sheets or layers of material.

An important object of the present invention is the simplification of apparatus used for joining or uniting the several laminations or assembled sheets of material and for facilitating and simplifying the operation thereof. This invention is designed to provide a more convenient means for uniting the laminations so that the labor involved is less and the time required is reduced. Thus, the invention aims to simplify, render more efficient and improve generally the production of glass of this character.

Another object of the invention is the provision of a novel method of and means for controlling the heating of the assembled sheets or laminations and for also controlling the application of pressure thereto.

Another object of the invention is the provision of a novel method for uniting the assembled sheets of material wherein both pressure and heat are gradually applied simultaneously thereto and wherein as the sheets of material heat up the pressure applied thereto is correspondingly increased.

A further object is to provide an improved type of apparatus including a "sheet" containing chamber or compartment within which the superimposed sheets or assembled layers of material to be joined are adapted to be placed, the apparatus being so constructed that the interior of said chamber or compartment is readily accessible so that the assembled layers of material to be joined may be placed therein or the finished composite sheet removed therefrom in any easy and convenient manner and without the necessity of disassembling any part of the apparatus.

The present invention contemplates the utilization of a sectional housing, each section carrying a flexible diaphragm and between which diaphragms the assembled sheets of material to be joined are adapted to be placed, novel means being provided for securing or coupling the housing sections together during the uniting or joining operation.

The invention further embodies means of a novel character for effecting an equalization of the pressure upon the diaphragms and the contents thereof.

Other objects and advantages of the invention will become more apparent during of course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention, Fig. 2 is a section taken substantially on line 2—2 of Fig. 1, Fig. 3 is a vertical transverse section through the housing, and Fig. 4 is a detail view of the apparatus.

In accordance with the present invention, the use of a circulating liquid is eliminated and the heating of the bonding material and/or the interposed layer of non-brittle material together with the subsequent application of pressure upon the assembled sheets of material is effected, briefly stated, by the use of heated air, gas, vapor, etc. under pressure.

Referring to the drawings, the improved apparatus provided by the present invention embodies a housing designated in its entirety by the letter A and within which housing is adapted to be placed the superimposed sheets or assembled layers of material which are to be united to form the laminated or composite sheet of glass. The housing A is preferably of a substantially rectangular formation and is composed of the upper and lower sections 5 and 6 respectively connected together at one end by means of a hinge 7 whereby the upper section 5 may be swung upwardly away from the lower section 6 when it is desired to place the assembled sheets to be joined therein or when it is desired to remove the finished composite sheet therefrom as will be more clearly hereinafter apparent.

The upper section 5 of the housing is preferably provided with an inwardly projecting substantially horizontal flange 8 extending entirely around the interior thereof as clearly shown and the undersurface of said flange is channeled out to provide a continuous channel or groove 9. The lower section 6 of the housing is also provided with an inwardly projecting horizontal flange 10 similar to and positioned directly beneath the upper flange 8, the lower flange 10 being likewise provided with a continuous channel or groove 11 similar to the groove 9 in the upper flange 8 and facing the same.

The upper and lower sections 5 and 6 of the housing A are provided or formed with pressure chambers 12 and 13 respectively facing one another. Seated across the open faces of said pressure chambers and forming closures therefor are the flexible diaphragms 14 and 15 of any suitable material such as rubber, rubber composition or the like. Thus, the diaphragm 14 constitutes the bottom of the upper pressure chamber 12 while the diaphragm 15 constitutes the top of the lower pressure chamber 13. The side and end edges or border portions of the upper diaphragm 14, are received within the channel 9 of flange 8 and securely clamped therein by means of clamping strip 16 and screws 17, the heads of which are preferably counter-sunken within said strips. The side and end edges or border portions of the lower diaphragm 15 are similarly received and secured within the channel 11 of flange 10 by clamping strips 18 and screws 19.

The upper and lower diaphragms 14 and 15 cooperate to form a "sheet" containing compartment or chamber 20 therebetween for receiving the superimposed sheets or assembled layers of material to be joined and which are herein designated in their entirety B. The laminated sheet of glass herein shown by way of illustration is composed of two sheets of glass 21 and 22 between which is interposed a single sheet or layer of non-brittle material 23 although a greater or less number of sheets of glass and non-brittle material may be used if desired.

Extending transversely within the upper pressure chamber 12 and located at spaced points longitudinally thereof are a plurality of electric heating elements 25 while a plurality of similar electric heating elements 26 extend transversely within the lower pressure chamber 13 at spaced points longitudinally thereof. These electric heating elements are provided to control the temperature within the pressure chambers and likewise the application of pressure upon the diaphragms and the contents thereof as will be more clearly hereinafter described. The air pressure within the pressure chambers may be readily ascertained by a reading of the air gauge 27.

The present invention also includes means of a novel construction for securing or coupling the housing sections together during the uniting or joining operation. To this end there are carried by the free end of the upper section 5 of housing A the oppositely disposed brackets 28 (one only being shown) which form bearings for a shaft 29. Mounted upon this shaft 29 and eccentrically fixed thereto is a disk 30 provided in its outer surface with a groove 31. Loosely mounted upon the disk 30 is a hook member 32, the lower free end or hook portion 33 thereof being adapted to hook over or engage a catch 34 carried by the lower section 6 of housing A while the opposite or upper end of the hook member 32 is formed with a collar or strap 35 surrounding the disk 30 and carrying a stop pin 36 projecting into groove 31. The hook portion 33 and catch 34 are provided with correspondingly bevelled faces as shown so as to facilitate their movement into engagement with one another.

When the housing sections 5 and 6 are properly coupled together, the various parts of the coupling mechanism assume the positions shown by the full lines in Fig. 1 with the hook member and catch interengaged with one another and the stop pin 36 received within the top of groove 31. When it is desired to disconnect the housing sections, the shaft 29 is rotated in a clockwise direction whereupon the disk 30 keyed thereto will naturally be rotated therewith. Upon initial rotation of said disk, the hook member 32 will be moved forwardly so as to disengage the hook portion 33 thereof from the catch 34.

During the rotation of disk 30, the pin 36 will run in the groove 31 but this groove is of a desired length so that as soon as the hook member is released from the catch, the stop pin will be engaged by the lower end wall of said groove and will be carried around with the disk whereby to swing the hook member entirely clear of the catch. The upper housing section can then be moved upwardly into the broken line position shown in Fig. 1 and when moved upwardly in this manner it will be apparent that the diaphragms will be separated so that the assembled layers of material can be placed within or the finished composite sheet removed from the housing or "sheet" containing compartment 20. When it is desired to again secure the housing sections together, the above cycle of operations is simply reversed. In other words, the shaft 29 is rotated in a counter-clockwise direction so that the hook member is first moved to engage the catch and then drawn upwardly into locking engagement therewith.

In the operation of the present invention, the housing sections 5 and 6 are first disconnected and the upper section 5 raised to its broken line position indicated in Fig. 1 so that the diaphragms 14 and 15 are separated and the sheet containing compartment 20 readily accessible. The assembled sheets of material to be joined are then placed upon the lower diaphragm 15, the adjacent faces thereof having been previously coated with a suitable cement, adhesive or bonding material. The upper housing section is then lowered and the said sections secured together by the clamping means above described.

The pressure chambers 12 and 13 are at all times adapted to be filled with air and preferably this air is always under an initial slight pressure such for example, about twenty or twenty-five pounds per square inch. This air may be pumped into the upper pressure chamber 12 through a suitable connection 24 and a portion of the air will pass from the upper chamber into the lower chamber in a manner to be hereinafter more clearly apparent whereby the initial pressure in the upper and lower chambers will be substantially equalized.

The electric heating elements 25 and 26 are then placed in operation and the temperature of the air within the pressure chambers is raised to a predetermined point or degree and maintained at such point for a desired period of time required to properly soften the bonding material and/or the interposed layer or layers of non-brittle material. After the required softening has been obtained, the temperature is gradually increased and as the temperature is increased, the pressure upon the diaphragms and the contents thereof will be correspondingly increased. In other words, as the air within the pressure chambers is heated, it naturally expands and builds up a pressure therein which is directed upon the diaphragms 14 and 15 and the contents thereof to secure adhesion and effect the union of the assembled sheets of material. When the desired amount of pressure has been built up within the pressure chambers and maintained upon the diaphragms and contents thereof for the proper length of time in which to secure perfect union of the assembled sheets of material, the electric heating elements are gradually placed out of operation. As the heating elements are turned off, the air within the pressure chambers will be allowed to gradually cool and as this air cools the pressure upon the assembled sheets of material will be decreased. An accurate control of the electric heating elements can be accomplished in any suitable manner such as by a system of rheostats or the like not here shown. Any air that may be trapped within the "sheet" containing compartment at the beginning of the uniting operation will be forced outwardly between the diaphragms through the air holes or groves 50 in the clamping strips 16 and 18 upon the application of pressure to the diaphragms.

It is of course desirable, in order that a uniform bond may be obtained between the laminations, that the pressure upon the upper and lower diaphragms be as nearly uniform as possible and in order that the pressure upon the laminations from above and beneath may be more or less equalized, the hinge 7 is of a peculiar novel construction to allow for an equalization of the pressure within the pressure chambers. In the construction of the hinge, the upper housing section 5 is provided with two spaced hinge parts 37 and 37' while the lower housing section 6 is provided with a single hinge part 38 received between the hinge parts 37 and 37'. Passing through the three hinge parts 37, 37' and 38 is a shaft 39 about which the upper housing section 5 is adapted to pivot as it is raised or lowered. The shaft 39 is provided with a bore 40 terminating short of the opposite ends thereof so that the said opposite ends are closed to the atmosphere. The shaft is also provided with three annular grooves or recesses 41, 42 and 43 communicating with the bore of shaft 39 by transverse passages 44, 45 and 46 respectively. Leading from the upper pressure chamber 12 are conduits 47 and 48 communicating with the recesses 42 and 43 respectively while leading from the lower pressure chamber 13 is a conduit 49 communicating with groove or recess 42. By means of the construction just described, the upper and lower pressure chambers 12 and 13 are in communication with one another at all times so as to allow for an equalization of the pressure therein.

Thus, when the pressure within the upper chamber 12 becomes greater than that in the lower chamber 13 a certain amount of this pressure will pass from the upper chamber through the conduits 47 and 48 into the recesses 41 and 43, through the openings 44 and 46 into the bore 40 of shaft 39, then outwardly of the bore through the passage 45 into recess 42, and thence into the lower chamber through conduit 49. Should the pressure within the lower chamber become greater than that in the upper chamber, a certain amount will pass from the lower chamber into the said upper chamber in the reverse direction to that above described. Explaining more fully, the air will pass from the lower pressure chamber through conduit 49 into recess 42, through passage 45 into bore 40 of shaft 39, through bore 40 in opposite directions and out through passages 44 and 46 into recesses 41 and 43, and thence through conduits 47 and 48 into the upper pressure chamber. It is believed that the construction and operation of the present apparatus will be readily understood from the foregoing explanation and that its practicability and the advantages to be gained from its use will be readily appreciated by those familiar with the production of laminated glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for the manufacture of laminated glass, a housing composed of upper and lower sections having pressure chambers facing one another, a diaphragm across the open face of each chamber constituting a closure therefor, means for building up a pressure within said pressure chambers and a hinge construction for pivotally connecting said upper and lower sections together at one end, said hinge construction being provided with conduits placing the upper chamber in communication with the lower chamber.

2. In apparatus for the manufacture of laminated glass, a housing composed of upper and lower sections having pressure chambers facing one another, a diaphragm across the open face of each chamber constituting a closure therefor, means for building up a pressure within said pressure chambers, and means for connecting said upper and lower sections together, said connecting means being provided with conduits placing the upper chamber in communication with the lower chamber.

3. The method of applying heat and pressure to a set of assembled sheets of material to be joined, which consists in placing the set of sheets between flexible pressing elements, confining a supply of air in back of each pressing element, and in heating the air to cause an expansion thereof whereby it will exert a pressure upon the flexible elements and effect the union of the assembled sheets of material, and in automatically equalizing the pressure upon said flexible elements by maintaining communication between the confined supplies of air.

Signed at Toledo, in the county of Lucas and State of Ohio, this 22nd day of May, 1928.

JOHN L. DRAKE.